United States Patent [19]

Allen

[11] 4,074,599

[45] Feb. 21, 1978

[54] PAPER WEB PERFORATING MACHINE

[75] Inventor: Frederick G. Allen, Loxbro, Canada

[73] Assignee: Wood Industries, Inc., Middlesex, N.J.

[21] Appl. No.: 705,247

[22] Filed: July 14, 1976

[51] Int. Cl.$^2$ .......................... B23D 25/12; B26D 1/56

[52] U.S. Cl. .......................................... 83/346; 83/678; 83/659

[58] Field of Search ................. 83/346, 347, 344, 659, 83/674, 678

[56] References Cited

U.S. PATENT DOCUMENTS

| | | | |
|---|---|---|---|
| 927,846 | 7/1909 | Flett | 83/678 |
| 1,313,325 | 8/1919 | Nordyke et al. | 83/346 |
| 2,882,763 | 4/1959 | Fry | 408/143 |
| 3,866,497 | 2/1975 | Wolfberg et al. | 83/346 |

*Primary Examiner*—Donald R. Schran
*Attorney, Agent, or Firm*—David S. Woronoff

[57] ABSTRACT

A machine for performing certain operations in the production of endless business forms has a plurality of cross-perforating knife blades for perforating the endless paper webs at predetermined increments, whereby the perforating knife blades are mounted in slots in the surface of rotating cylindrical bodies and are cutting through the paper webs with their spaced apart perforating knife edges against a rotating "anvil" cylinder which has a hardened, smooth surface. The cyclic impacts of the perforating blades on the anvil cylinder can become resonant with critical frequencies of the anvil cylinder at certain speeds of the latter and with a certain number of inserted perforating blades causing the destruction of the cutting edges of the former, and therefore the structure of the anvil must be such that no resonances will occur between the cyclic impacts of multiple perforating blades at high speed production operations of the machine. Similarly the structure of the knife blade cylinder may be such that resonance will not occur and the combined anvil cylinder and knife blade cylinder may be so structured to shift or reduce resonant frequency problems.

13 Claims, 5 Drawing Figures

PAPER WEB PERFORATING MACHINE

BACKGROUND OF THE INVENTION

A. Field of the Invention

The invention relates generally to paper cutting devices and particularly to paper web perforating devices having rotatable anvils against which multiple perforating knives mounted in spaced distances on the surface of rotating cylinders operate.

B. Description of the Prior Art

Machines and devices for perforating paper webs in the longitudinal and in the transverse direction are known in the art. Such devices have discs with perforating tools operating against die rings correspondingly having female discs and having further one or two cross perforating cylinders carrying one or more axially extending perforating knife blades arranged in slots in the surface of the cylinders, which operate against an anvil cylinder having a smooth, hardened surface. The perforating blades are adjusted in their slots in the perforating cylinders in such manner, that their cutting knife edges touch the hardened, smooth surface of the anvil cylinder without breaking or bending the cutting knife edges, thus cutting cleanly through the paper webs, which are fed over the anvil cylinder.

However it has become known that machines of this kind could only be operated at relatively slow speed when more than 2 perforating blades had been set 180° C apart from another in the perforating cylinder. The problem was that difficulties started mounting with increased speed of the machine or when 4, 6 or 8 blades had been arranged at spaced circumferential distances on the periphery of the perforating cylinder. These difficulties resulted from vibrations of the anvil cylinder under the rythmic impacts of the perforating blades which inexplicably got bent and blunted knife edges from the periodical hammering at the hardened surface of the anvil, thus rendering a perforation impossible after a short operation, particularly in the center portion of the paper webs. By making the journal ends of the otherwise solid anvil cylinder stronger and/or by increasing and prestressing the cylinder bearings the adverse condition did not improve and that problem is now solved by the applicant's invention. The word "webs" should be understood to include the singular "web" as well as the plural.

The most relevant prior art are U.S. Pat. Nos. 1,018,155, 1,098,060, 1,714,583 issued to Bengoush, Spiller and Anthony respectively. None of these show an anvil cylinder or a knife blade cylinder like that taught in this application.

SUMMARY

The invention consists in the novel parts, construction arrangements and improvements herein shown and described. The invention is direction toward the novel structure of the anvil cylinder and the knife blade cylinder (or either of them) (in the transverse perforation part of the paper webs perforation machine) against which the perforating blades of the perforating cylinders operate. The conventional anvil cylinder consists of a heavy piece of solid steel which has a substantial stiffness and resistance to deflection in bending. However a rotating body of this kind has a basic natural frequency of vibration (resonant frequency) and thus has a basic critical speed with respect to critical tolerances of adjacent parts. Multiples of this basic first order critical speed occur, and when load impacts are applied to the rotating body at the same frequency of vibration of the cylinder at one of the critical speeds, a harmonic resonance will occur, resulting in substantial deflections and vibrations of the rotating cylinder. Such deflections and vibrations cause the perforating blades to hammer hard on the surface of the anvil cylinder, and their cutting knife edges are bent and damaged. A typical example of the range of these critical speeds is shown in the table:

| order of critical speed | 1 | 2 | 3 | 4 | 5 | 6 | 7 |
|---|---|---|---|---|---|---|---|
| number of cylinder revol./min. | 775 | 675 | 720 | 600 | 540 | 440 | 480 |

indicating also the order of intensity of damage to the knife edges of the blades. The worst conditions had been found when 6 and 8 perforating blades had been inserted in the perforating cylinders.

By changing the structure of the anvil cylinder the natural frequency and the range of the subsequent multiples thereof is changed to such an extent, that the critical speeds and the deflections and vibrations are no longer in the range of the rythmic impacts of the perforating actions of the blades. The gist of the invention is to make either or both the anvil cylinder and the knife blade cylinder partly hollow or filled with a different material whereby the moment of inertia of the cross sections of the partly hollow or partially filled cylinder varies over the length of the cylinder between the bearing supports thereof without sacrificing the degree of stiffness of the cylinder. It is at the same time an advantage to reduce the weight of the cylinder or cylinders whereby the deflection thereof in the center under its own weight between the supporting bearings is reduced.

Objects and advantages of the invention will be set forth in part hereafter and in part will be obvious herefrom or may be learned by practicing the invention the same being realized and attained by means of the instrumentalities and combinations pointed out in the appended claims.

It is an object of the invention to provide an improved anvil cylinder and/or perforating cylinder for a high speed multiple blade paper webs perforating machine.

A further object of the invention is to provide an anvil cylinder and/or a perforating cylinder for a high speed paper webs perforating machine which has a partly hollow structure.

Furthermore it is an object of the invention to provide a novel anvil cylinder and/or perforating cylinder in a high speed multiple blade paper webs perforating machine by which the production speed of the latter is substantially improved.

Various further and more specific purposes, features and advantages will clearly appear from the detailed description given below taken in connection with the accompanying drawing which forms part of the specification and illustrates merely by way of example one embodiment of the device of the invention.

BRIEF DESCRIPTION OF THE DRAWING

In the following description and in the claims, parts will be identified by specific names for convenience, but such names are intended to be as generic in their application to similar parts in the several figures of the drawing, in which

DESCRIPTION OF THE PREFERRED EMBODIMENT

Figure 1:
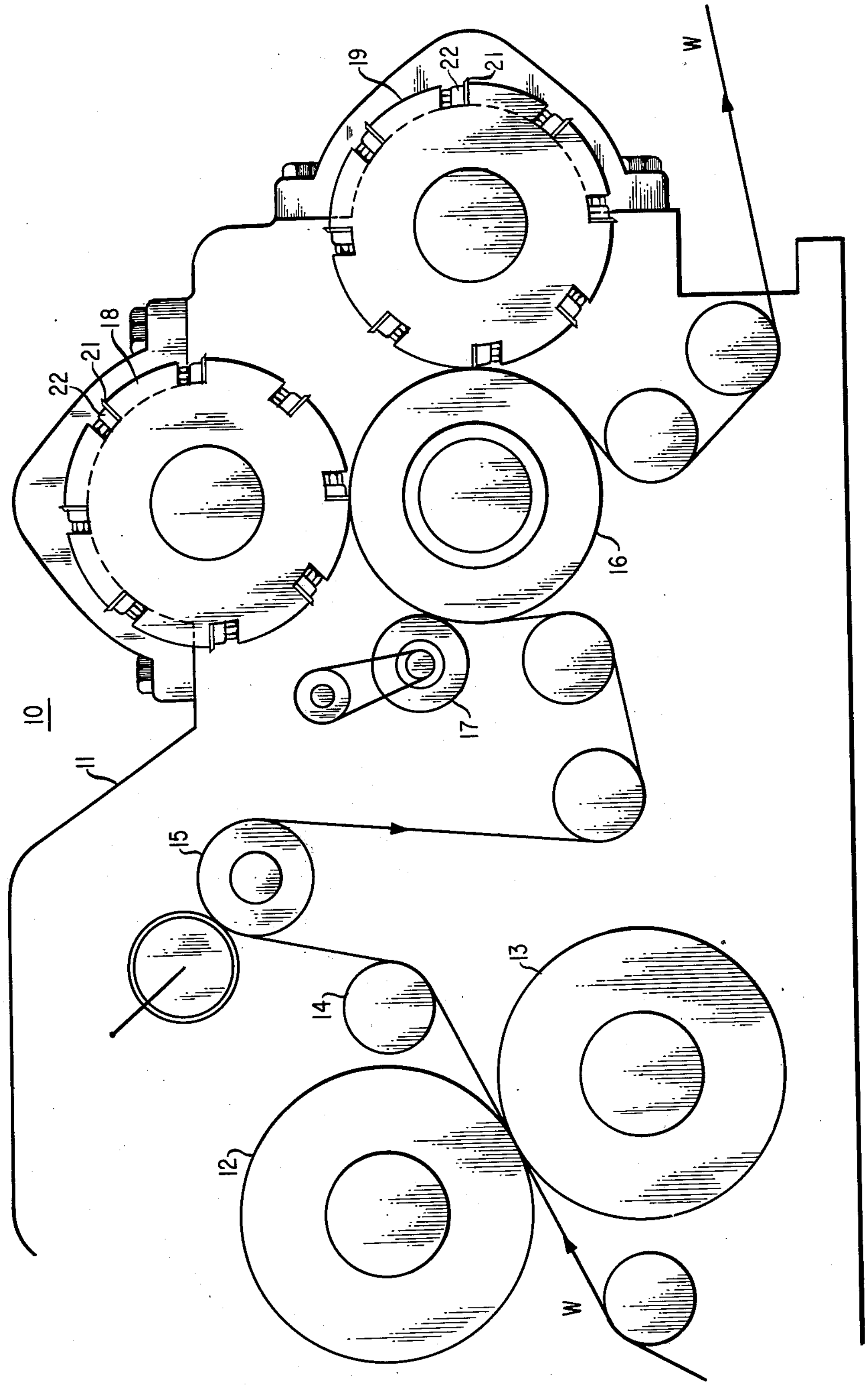
FIG. 1 illustrates schematically the perforating machine
Figure 4:
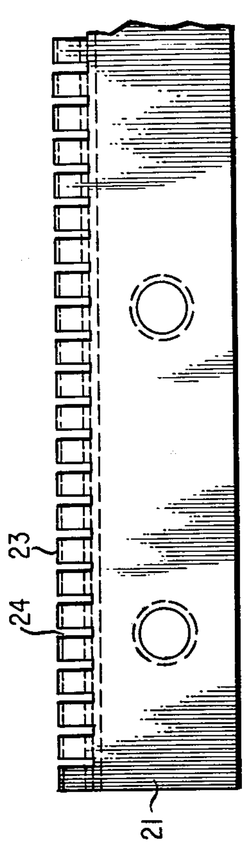
FIG. 4 is a side view of the perforating blade.
Figure 3:
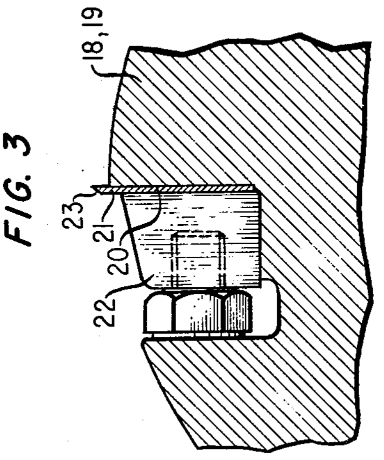
FIG. 3 is an end view of the perforating knife blade and of the blade holding bar with a portion of the perforating cylinder partly broken away.
Figure 2:
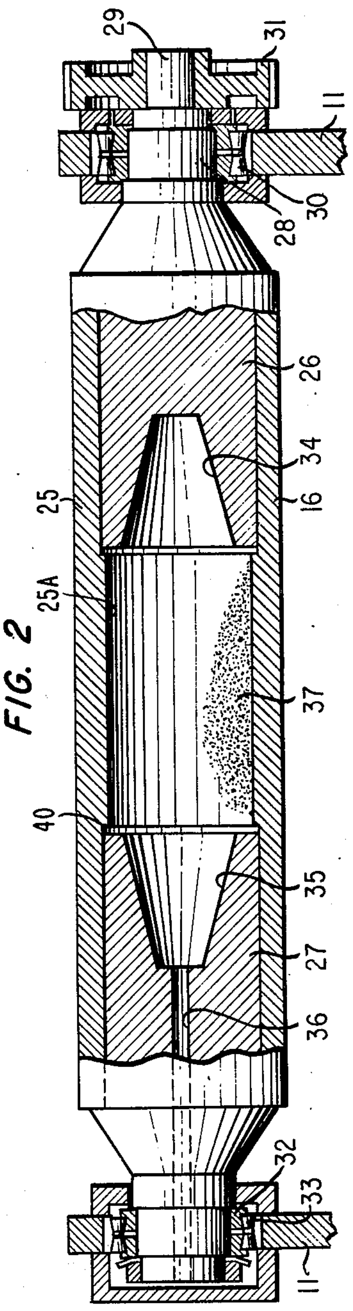
FIG. 2 shows an axial section of the partly hollow anvil cylinder.

Referring now in detail to the drawing illustrating a preferred embodiment by which the invention may be realized; there is a perforating machine 10 shown, which has a frame 11 in which two driven "hole punching" cylinders 12, 13 are rotatably located in adequate bearings for punching holes through the paper webs W or webs in successive order. Paper web W is further led over an idler roller 14 to a driven slitter roller 15 where it is longitudinally slit into ribbons of page width. The ribbons are then fed over further idler rollers to a driven "impression" or "anvil" cylinder 16. Propeller rollers 17 are arranged to hold the ribbons in tight contact with the surface of anvil cylinder 16. Two perforating cylinders 18, 19 which are driven in unison with anvil cylinder 16, are located adjacent to anvil cylinder 16. It is obvious that also a single perforating cylinder 18 can be arranged, if so desired. Each one of the two shown perforating cylinders 18, 19 has a plurality of axially extending slots or grooves 20 in the surface thereof, in which the perforating knife blades 21 are adjustably clamped by means of bars 22. Knife blades 21 are set to touch the surface of anvil cylinder 16 so that they will cut cleanly through the ribbons of paper webs across the width thereof but without hitting hard at the hardened surface of anvil cylinder 16. The cut is obviously an interrupted one since blade 21 consists of a plurality of small knife edges 23 which are separated from one another by a narrow gap 24. Thus the cut across the width of the ribbons of paper webs W is actually a "line" perforation.

Anvil cylinder 16 consists of a tubular steel sleeve 25 having a smooth, hardened surface. End plugs 26, 27 are pressed into steel sleeve 25 and are welded to the latter. Plug 26 has further extensions 28, 29 for accommodating the seats for the roller bearing 30 and for the drive gear 31, respectively, whereas plug 27 has only the extension for the seat 32 for the bearing 33. Plugs 26, 27 have cone-shaped inner cavities 34, 35 extending from the inside of the inner end of the plugs to a certain predetermined depth, and the total pressed-in length of the plugs 26, 27 is predetermined at a certain proportion of the total length of the body of anvil cylinder 16. Plug 27 further has an axially extending central bore 36 through which sound absorbing material 37, such as for example a polyurethane foam, may be filled into the inner cavity of anvil cylinder 16.

Figure 5:
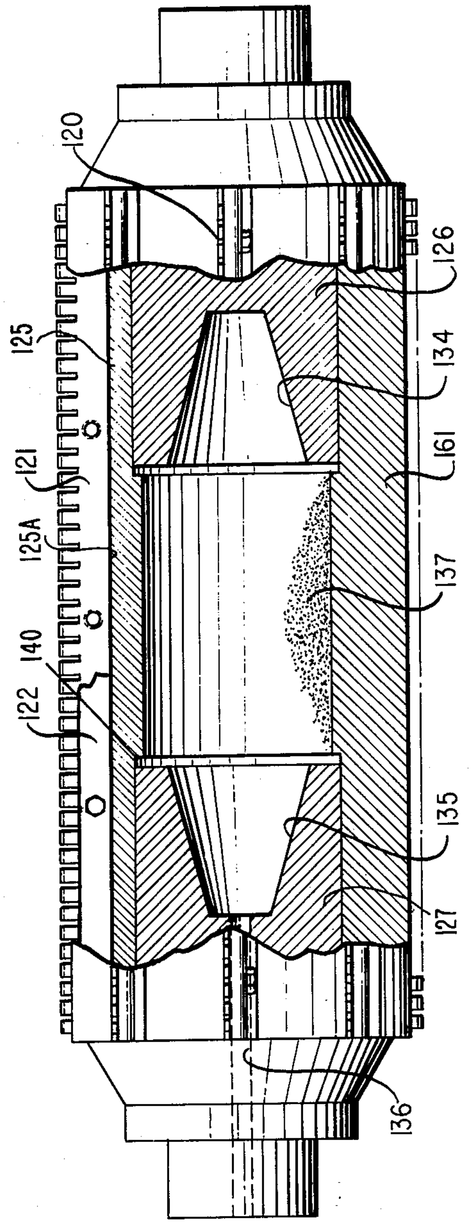
FIG. 5 shows an axial section of the partly hollow perforating cylinder.

In another embodiment of the present invention, a perforating cylinder (Show in FIG. 5) 116 consists of a tubular steel sleeve 125 having a smooth hardened surface. End plugs 126, 127 pressed into the sleeve 125 and welded thereto. Plugs 126, 127 have extensions 128, 129 for accommodating the sets of roller bearings. Plugs 126, 127 have cone-shaped inner cavities 134, 135 extending from the inner end of the plugs to a predetermined length and the total pressed in length of the plugs 126, 127 is determined in proportion to the total length of the perforating cylinder 116. Plug 127 has an axially extending bore 136 through which sound absorbing material 137 may be placed. Axially extending slots 120 have perforating knife blades 121 are adjustable, clamped by means of bars 122. Tubular sleeves 25, 125 have radially inwardly depending edges 40, 140 forming stops for the end caps 26, 27, 126, 127 and a discontinuity in the inner surfaces 25A, 125A of the sleeves 25, 125. The end caps 26, 27, 126, 127 may be formed from a material having a different density than that of the sleeve members 25, 125.

The natural frequency and the critical speed of this structure, as well as the harmonic multiples of the first critical speed is now out of the range of any resonance at the high production speed of the machine. Thereby no further hammering of the knife edges of the perforating blades against the hardened surface of anvil cylinder 16 can occur and the knife edges 23 of the perforating blades 21 remain sharp and undamaged.

While the invention has been described and illustrated with respect to a certain preferred example which gives satisfactory results, it will be understood by those skilled in the art after understanding the principle of the invention, that various other changes and modifications may be made without departing from the spirit and scope of the invention, as it is expressed in the appended claims.

I claim:

1. A high speed paper web cutting machine having at least one cutting cylinder, said perforating cylinder having at least one groove spaced axially extending over the length thereof, a knife blade means having radially extending cutting edges adjustably clamped in said groove, said machine comprising an anvil cylinder adapted for carrying a paper web, said anvil cylinder having a smooth, hardened surface, said cutting cylinder disposed to operate in close relationship with said anvil cylinder, and said knife blade means being adjusted in such manner, as to have their cutting edges able to cut a paper web, touching said surface of said anvil cylinder said anvil cylinder formed from a hollow sleeve member having end cap members permanently fixed thereto; each of said end cap members having a substantially solid portion on one end thereof and a conical shaped cavity on the other end thereof such that the moment of enertia of the anvil cylinder is significantly altered from that of a solid member and such that resonant frequency of the anvil cylinder in a radial direction is altered.

2. A high speed paper web cutting machine according to claim 1, having more than one cutting cylinder disposed to operate in close relationship with said anvil cylinder, said end cap members being formed from a material having a different density than the material from which said anvil cylinder is formed.

3. In a high speed paper web cutting machine described in claim 1 wherein:

said end cap members having a predetermined length in predetermined proportion to the length of said anvil cylinder and said end cap members having a cone-shaped inner cavity extending over a predetermined depth in said cap members and one of said end cap members having a channel formed therein extending from said inner cavity to the exterior of said anvil cylinder.

4. In a high speed paper web cutting machine according to claim 3, wherein:

energy-absorbing means filling said hollow sleeve member and said inner cavities of said end cap members.

5. The device claimed in claim 1 wherein:

said sleeve member has an inner surface having a discontinuity formed therein.

6. The device claimed in claim 1 wherein:

said anvil cylinder has axially varying density.

7. The device claimed in claim 6 wherein:

said cutting cylinder has a plurality of grooves for holding knife blades.

8. The device claimed in claim 6 wherein:

said cutting cylinder have four or more grooves for holding knife blades.

9. The device claimed in claim 1 wherein:

said cutting cylinder is formed from more than one material.

10. The device claimed in claim 9 wherein:

said cutting cylinder comprises a hollow body having end plugs fastened in both ends in said body, said end plugs having a predetermined length in predetermined proportion to the length of said hollow body and said end plugs having a cone-shaped inner cavity extending over a predetermined length in said plugs.

11. The device claimed in claim 10 wherein:

energy absorbing means fill said cutting cylinder hollow body and said inner cavities of said end plugs.

12. The device claimed in claim 10 wherein:

said cutting cylinder hollow body has an interior surface having a plurality of radially inwardly depending steps for receiving said end plug members and forming a discontinuity in said interior surface.

13. A high speed paper web perforating machine having at least one perforating cylinder, each of said perforating cylinders having at least one groove spaced axially extending over the length thereof, knife blades having perforating edges adjustably clamped in said groove, said machine comprising an anvil cylinder having a smooth hard surface and said perforating cylinder formed from more than one material, said perforating cylinder disposed to operate in close relationship with said anvil cylinder, both said anvil cylinder and said perforating cylinder formed from hollow sleeve members each having inner surfaces with a radially inwardly depending step, both of said sleeve members having end cap members fixed thereto, each of said end cap members having a solid outer portion and an inner portion having a conical shaped inner cavity, said end cap members extending into said sleeves members to touch said radially inwardly depending step formed in each sleeve member.

* * * * *